Figure 1:
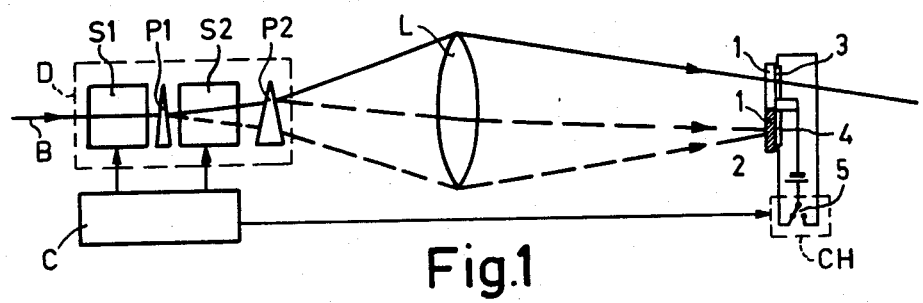

United States Patent
Schmidt et al.

[11] 3,953,108
[45] Apr. 27, 1976

[54] DIGITAL BEAM DEFLECTOR

[75] Inventors: Klaus Peter Schmidt, Quickborn; Claus Wiech, Hamburg, both of Germany

[73] Assignee: U.S. Philips Corporation, New York, N.Y.

[22] Filed: Oct. 24, 1974

[21] Appl. No.: 517,780

[30] Foreign Application Priority Data
Oct. 27, 1973  Germany.......................... 2353950

[52] U.S. Cl............................. 350/150; 350/DIG. 2
[51] Int. Cl.²........................................... G02F 1/31
[58] Field of Search ........ 350/150, 160 LC, DIG. 1, 350/DIG. 2

[56] References Cited
UNITED STATES PATENTS

| | | |
|---|---|---|
| 3,572,895 | 3/1971 | Schmidt.......................... 350/150 X |
| 3,703,137 | 11/1972 | Anderson et al. .............. 350/150 X |
| 3,821,466 | 6/1974 | Roese ............................ 350/150 X |

*Primary Examiner*—John K. Corbin
*Assistant Examiner*—Wm. H. Punter
*Attorney, Agent, or Firm*—Frank R. Trifari; Simon L. Cohen

[57] ABSTRACT

In a digital light deflector which includes electrooptical polarization switches and birefringent prisms the influence of undesirably deflected radiation can be suppressed by providing, behind the final deflection stage, a lens for spatially separating the undesirably deflected radiation from the signal radiation and a radiation chopper which comprises a plurality of elements and is controlled in synchronism with the polarization switches.

4 Claims, 3 Drawing Figures

U.S. Patent   April 27, 1976   3,953,108

DIGITAL BEAM DEFLECTOR

The invention relates to a digital beam deflector comprising a plurality of deflection stages which each comprise an electrooptical polarization switch and a birefringent element.

In such an apparatus each deflection stage is capable of deflecting a beam of light, for example a laser beam, at will in either of two directions. The deflection angle is doubled from stage to stage. Thus a deflector comprising $n$ deflection units is capable of deflecting a radiation beam, for example a laser beam, in $2^n$ different directions. Each unit comprises a birefringent element (for example a birefringent prism) preceded by a polarization switch. The birefringent prism has different refractive indices for two mutually perpendicular directions of polarization of the radiation passing through. Hence a beam can be deflected in two different directions in accordance with the direction of polarization of the incident radiation. Selecting a direction of polarization and consequently a direction of deflection is effected by means of the above-mentioned polarization switch.

Undesirable elliptically polarized radiation which may be produced by faults in the arrangement of prisms or by the application of incorrect electric voltages to the polarization switches (which may be Kerr cells), gives rise not only to radiation in the desired direction (hereinafter referred to as signal radiation) but also to radiation in undesirable directions (hereinafter referred to as disturbance radiation). The disturbance radiation has a direction of polarization which mainly is at right angles to that of the signal radiation.

As has been described in our prior U.S. patent application Ser. No. 288,594, filed Sept. 13, 1972, and now U.S. Pat. No. 3,819,939 the undesirably deflected radiation or disturbance radiation can be suppressed by using the differences in direction of polarization of the signal radiation and the disturbance radiation. For this purpose an additional polarization switch and a polarizer are disposed after the final deflection stage. The additional polarization switch polarizes the radiation which emerges from the deflector so that this radiation is transmitted by the polarizer without attenuation, whereas the disturbance radiation, which is polarized in a direction at right angles to that of the signal radiation, is intercepted by the polarizer.

A disadvantage of the arrangement is that the aperture and angular aperture of the polarizer and the polarizing switch are comparatively small. The term "aperture" is used herein to mean the effective radiation-transmitting opening of the apparatus. The term "angular aperture" is used herein to mean the range of angles at which the radiation is allowed to be incident without the arrangement losing the desired property. A further disadvantage of the prior suggestion is that the additional polarization switch requires high switching voltages.

It is an object of the present invention to provide a deflector in which the disturbance radiation is suppressed and which does not have the aforementioned disadvantages. For this purpose the deflector according to the invention is characterized by the provision, after the final deflection stage, of a lens for spatially separating the signal radiation from the disturbance radiation and of a radiation chopper comprising a plurality of elements, the individual elements of the chopper comprising a plurality of elements, the individual elements of the chopper being adjustable by an electronic signal from a circuit which also controls the polarization switches of the deflection stages.

Figure 2:
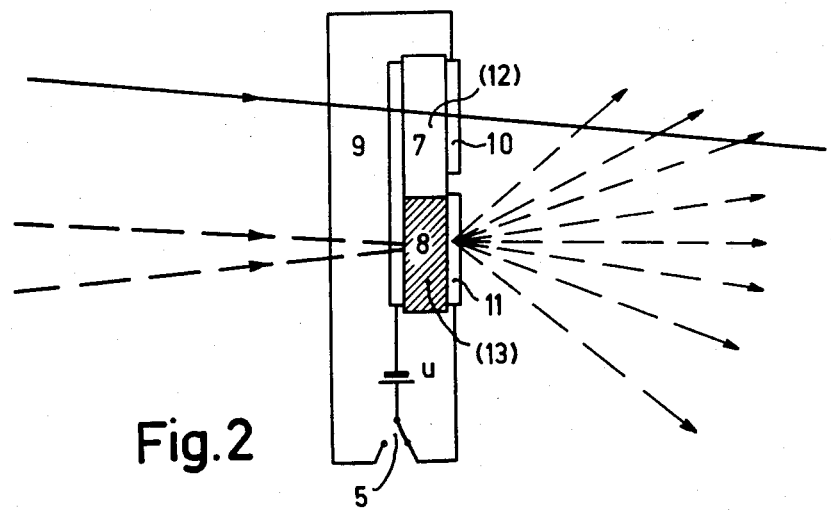
Figure 3:
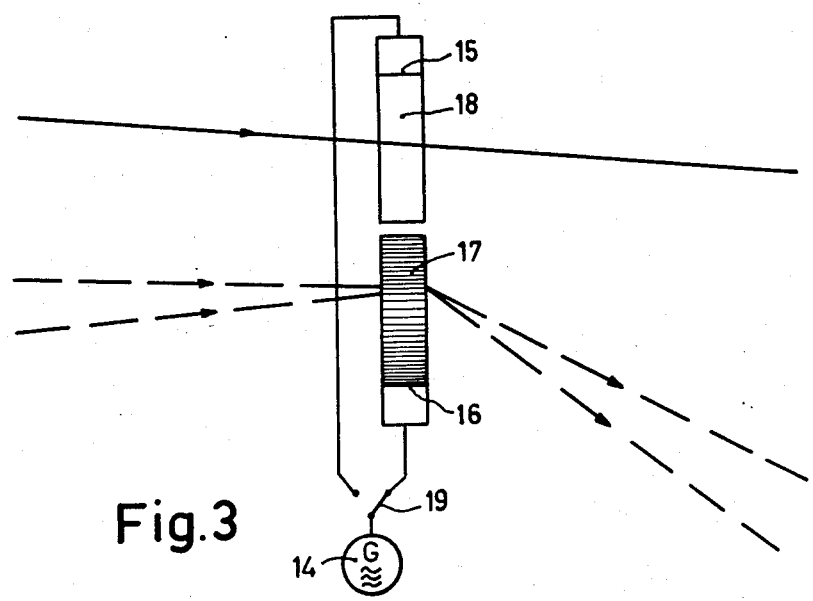

Embodiments of the invention will now be described, by way of example, with reference to the accompanying diagrammatic drawings, in which:

FIG. 1 shows schematically an embodiment of a beam deflector according to the invention, and FIGS. 2 and 3 show embodiments of a radiation chopper for use in such a deflector.

Referring now to FIG. 1, a digital beam deflector D comprises two deflection stages. The two stages each comprise a polarization switch $S_1$ and $S_2$ respectively and a birefringent prism $P_1$ and $P_2$ respectively. The polarization switches are controlled by an electronic control circuit C. In accordance with the voltage applied to the polarization switches (which may comprise electrooptical crystals showing the Kerr effect) a radiation beam B, for example a laser beam, is deflected by the beam deflector D in one of four possible directions. In FIG. 1 (and in FIGS. 2 and 3) the desired direction is indicated by a solid line. The broken lines indicate undesirable directions of deflection.

In its passage through the successive deflection stages the parallel laser beam can be deflected through ever increasing angles. The beams which owing to the application of given voltages to the polarization switches ($S_1$, $S_2$) emerge from the deflector D at different angles will trace nonhomocentric paths relative to the optical axis of the system. That is to say that the imaginary backward extensions of the rays of the various beams do not intersect in one point.

According to the invention the nonhomocentricity can be utilized to supress any disturbance radiation. Behind the final prism of the deflector a lens L is provided which spatially separates the various beams which may emerge from the deflector. Because the signal radiation and the disturbance radiation always form different beams, they can be directed by the lens L to different portions of an electronically controlled shutter or radiation chopper CH. The radiation chopper CH is controlled by the electronic circuit C in synchronism with the polarization switches. The radiation chopper may comprise two symmetrical halves of sufficiently large aperture of which always one is transparent and the other opaque.

Such a radiation chopper can be implemented by means of various physical effects, for example CdS monocrystals may be used which have a sharp transmission boundary at about 5,000 A., which boundary can be shifted by varying the temperature. Crystals 1 and 2 of the radiation chopper CH of FIG. 1 can be switched between transparent and opaque states for laser radiation of a wavelength of 5,145 A. (argon laser) by means of transparent heating elements 3 and 4 and an electronic switch 5 which is controlled by the electronic circuit C. Switching times of 100 ms can be achieved.

FIG. 2 shows a radiation chopper which includes liquid crystals 7 and 8. When an electric field produced between the transparent electrodes 9 and 10 or 11 respectively is applied to one of the two halves 12 and 13, the incident light is greatly scattered by the liquid crystals. Thus the respective half of the chopper is opaque. The switching times are of the order of milliseconds. Instead of the liquid crystals, plates made of ceramic PLZT (lanthanum-doped lead zirconate titanate) may be used which also greatly scatter the incident light. In this case the switching times are of the order of microseconds.

The influence of the disturbance radiation may alternatively be suppressed by deflecting it away from the signal radiation. For this purpose acousto-optical elements may be used, as is shown in FIG. 3. An ultrasonic generator 14 can be connected by a switch 19, which is also controlled by the circuit C of FIG. 1, to a transducer 15 or 16 of a cell 18 or 17 respectively. The generator 14 can produce an ultrasonic wave field in one of the cells 17 and 18, which field deflects the disturbance radiation from the direction of propagation if the signal radiation. In this arrangement also switching times of the order of microseconds are obtainable.

The invention is described by way of example with reference to a digital beam deflector comprising two deflection stages. Obviously, the inventive idea may also be applied to a beam deflector having a large number of stages. Furthermore a deflector capable of deflecting a radiation beam in two co-ordinate directions may be provided with the elements according to the invention for suppressing the influence of disturbance radiation.

What is claimed is:

1. Digital beam deflector of the type comprising an electrical control circuit, a plurality of deflection stages each connected to said electrical control circuit and which each comprise an electrooptical polarization switch and a birefringent element, said beam deflector providing output signal radiation in a desired direction and disturbance radiation in undersirable directions, the improvement comprising a lens after the final deflection stage for spatially separating the signal radiation from the disturbance radiation and a radiation chopper after the lens comprising a plurality of signal variable radiation deflecting elements, each of said elements being connected to and being adjustable by an electronic signal from said control circuit which also controls the polarization switches in the deflection stages to selectively block the disturbance radiation separated by said lens.

2. Deflector as claimed in claim 1, wherein the elements of the radiation chopper comprise CdS monocrystals provided with transparent heating elements.

3. Deflector as claimed in claim 1, wherein the elements of the radiation chopper comprise liquid crystal elements provided on either side with transparent electrodes.

4. Deflector as claimed in claim 1, wherein the elements of the radiation chopper comprise acoustooptical deflection cells energized by an ultrasonic generator.

* * * * *